United States Patent Office.

ITHAMAR B. MERRILL, OF DEXTER, MAINE.

Letters Patent No. 77,069, dated April 21, 1868.

IMPROVED BLACKING FOR LEATHER, &c.

*The Schedule referred to in these Letters Patent and making part of the same.*

TO ALL WHOM IT MAY CONCERN:

Be it known that I, ITHAMAR B. MERRILL, of the town of Dexter, county of Penobscot, and State of Maine, have invented a new and useful Compound for Blacking and Polishing Leather; and I do hereby declare the following to be a full and exact description of the same.

My invention consists of the following ingredients combined and compounded, as hereafter described. To make sufficient for sixty dozen rolls, I take eighty-two pounds of beef-tallow, six quarts castor-oil, four quarts whale-oil, three pounds rosin, nine pounds beeswax, one pound lamp-black, one pound ivory-black, and two pounds pine coal.

To enable others skilled in the art to make my compound blacking, I will proceed to describe my method of preparing the same.

First. I pulverize the pine coal to a very fine powder, and also crush the rosin into small pieces.

Second. I take a suitable-sized vessel, made of tin or iron, in which I place the tallow, castor and whale-oil, and beeswax, melt over a slow fire, thoroughly stirring the same until well mixed; then I add the lamp-black, ivory-black, pine coal, and rosin, stirring them gradually into the mass already melted in the vessel, until the whole mass is well combined.

Third. I then run the mass, so combined, into suitably-sized tin moulds, or put up in tin boxes, ready for use.

What I claim as new, and desire to secure by Letters Patent, is—

A blacking and polishing-compound, composed of the above-named ingredients, in the manner and about the proportions substantially as described.

ITHAMAR B. MERRILL.

Witnesses:
   WM. M. ROBINSON,
   JOSEPH SHEPHERD.